Feb. 19, 1963       J. N. ENGELSTED       3,078,396
                  DEMAGNETIZING APPARATUS
Filed April 30, 1959                    2 Sheets-Sheet 1

*INVENTOR.*
JOHN N. ENGELSTED

BY *Kenway, Jenney,*
*Witter & Hildreth*

ATTORNEYS

Feb. 19, 1963 J. N. ENGELSTED 3,078,396
DEMAGNETIZING APPARATUS
Filed April 30, 1959 2 Sheets-Sheet 2

INVENTOR.
JOHN N. ENGELSTED
BY Kenway, Jenney,
Witter & Hildreth
ATTORNEYS

United States Patent Office 3,078,396
Patented Feb. 19, 1963

3,078,396
DEMAGNETIZING APPARATUS
John N. Engelsted, Petersham, Mass., assignor to O. S. Walker Company, Inc., Worcester, Mass., a corporation of Massachusetts
Filed Apr. 30, 1959, Ser. No. 810,118
8 Claims. (Cl. 317—157.5)

The present invention relates to demagnetizing apparatus and is concerned more particularly with apparatus by which a succession of work pieces may rapidly and effectively be demagnetized so as substantially to eliminate all traces of residual magnetism.

In the manufacture of such articles as ball bearings, aircraft parts and components for guidance and navigational equipment, it is essential to reduce the residual magnetism to values substantially below what was formerly considered sufficient. Even slight traces of magnetism can disturb the operation of sensitive devices, while the necessity for maintaining absolute cleanliness of the moving parts of precision apparatus requires that there be no residual magnetism to attract ferrous particles and dust.

Almost without exception articles made of ferrous materials are found to have considerable residual magnetism upon completion. While basically all that is needed to demagnetize such articles is to subject the work piece to a strong magnetic field and then, while repeatedly reversing the direction of the field, gradually reduce the flux in the work to zero either by slowly withdrawing the work from the region of the intense field or by gradually decreasing the current in the flux-generating coil, in practice the problem is relatively complex, particularly where a multiplicity of work pieces are to be demagnetized on a production basis.

In the first place, whatever the mode of bringing about the reduction in flux in the work, it is essential that sufficient time be allowed for the gradual decay of the flux with each reversal of the field, starting from an initial high value. In general, it is preferable to accomplish the flux reduction by control of the current in the demagnetizing coil. This avoids the necessity for providing mechanism by which the work can be bodily removed from the demagnetizing coil, as would be required if the coil remained continuously energized.

Another factor favoring the controlled-current mode of operation is that the initial flux must be at a high level, requiring high circulating current in the demagnetizing coil. With controlled-current operation, these currents at the initiation of a demagnetizing cycle can be considerably in excess of the continuous-duty current carrying capacity of the wire. As a consequence, however, it becomes necessary to control the activation of the demagnetizing apparatus in accurately timed relation to the presence of the work piece, with provision for control of the decay characteristic following application of the initial high current for peak flux at the start.

It is likewise desirable that the initial flux density bear some correlation with the size of the work piece so that the demagnetization may be made fully effective both for large and for small work pieces, yet with the demagnetization treatment taking no longer time nor greater power than is necessary to meet the specified requirements as to freedom from residual magnetism in the work.

It is therefore an object of the present invention to provide new and useful demagnetizing apparatus and systems, adapted for precise automatic control of the demagnetizing cycle so that work pieces of various sizes may be effectively demagnetized rapidly and with minimum power consumption.

It is likewise an object of the invention to provide a means for controlling demagnetizing apparatus so that the control may take place at relatively low power levels and thus avoid the necessity for directly switching relatively high currents.

More particularly, it is an object of the invention to make use of the properties of variable reactance devices, customarily termed saturable reactors, in such fashion as both to simplify and to enhance the control over the demagnetizing operation.

The invention likewise has as one of its objects the provision of demagnetizing apparatus wherein the demagnetizing flux at the outset of the cycle rises to a high initial value, thereafter decaying in a controlled manner to zero to leave the work, whether small or large within the dimensional capacity of the demagnetizing coil, free of residual magnetism within the requirements of even the most rigid specifications for aircraft instruments and other precision devices.

In accordance with these and other objects, a feature of the invention involves the provision of demagnetizing apparatus wherein the change in reactance afforded by a controllable saturable reactor is employed to regulate the current in the demagnetizing coil to achieve the desired change in flux from maximum to minimum while the work piece remains within the coil.

More specifically, a feature of the invention involves circuit configurations and control arrangements by which the demagnetization cycle may take place automatically upon the arrival of a work piece within the demagnetizing coil and wherein the work may be discharged automatically upon completion of the demagnetization.

Still another feature involves the provision of demagnetizing apparatus and controls therefor wherein relatively compact and efficient apparatus may be provided, capable of generating very high initial flux at the inception of the demagnetization cycle and with controllable slow-decay characteristics to insure that the residual magnetism in the work is reduced to extremely low levels at the completion of the cycle.

In the drawings illustrating the invention,

Figure 2:
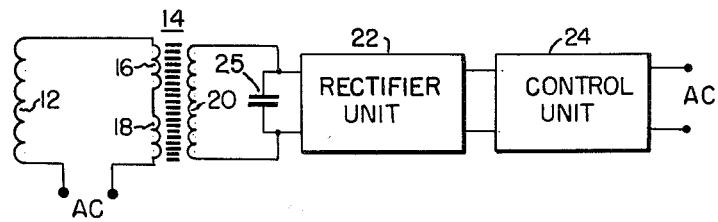
FIG. 2 is a schematic diagram illustrating one form of circuit arrangement of the demagnetizing apparatus.

Referring first to FIG. 2 of the drawings wherein a simplified arrangement of the invention is disclosed, the demagnetizing coil to which the work is exposed is indicated at 12. In general, this coil will be of a configuration such as to allow the work piece to be received within its center while resting on a suitable support. Alternatively, the work coil may consist of a coil or coils with an iron core or core system arranged to couple the demagnetizing flux to the work piece.

Connected in series with the demagnetizer coil 12 is a saturable reactor indicated generally at 14, consisting of a pair of windings 16 and 18 and a control winding 20. The windings 16 and 18, termed the output or controlled windings, may be disposed on the outer legs of the core, while the control winding 20 is placed on the central leg in order to provide a balanced arrangement of the output windings relative to the control coil. In general, the control coil will have many more turns than the output windings. While the output windings are shown connected in series, they may be connected in parallel when desired for greater current carrying capacity and lower reactance, in accordance with conventional reactor practice, in either case the output windings, being connected with polarities such as to provide cancellation of the induced A.C. voltage. The demagnetizing circuit, comprising the coil 12 and the reactor output coils 16 and 18, is connected to a suitable source of alternating current having current capacity sufficient to provide the maximum desired flux in the demagnetizing coil.

The control coil 20 of the reactor is supplied with direct current from rectifier 22, the input to which is under the control of means indicated generally at 24. The control may consist, in its simplest form, of merely a switch by which the control voltage may be applied to and removed from rectifier 22 while the rectifier remains connected across the control winding 20 to maintain a path for the circulating decay current. By reason of the substantial inductance of the control winding, the reactor causes a gradual rather than an abrupt decrease in work coil current when the control winding is deenergized. The invention also contemplates that additional control means may be employed so that the current through the control winding and therefore in the demagnetizing coil may be caused to decay in accordance with a predetermined adjustable function or characteristic as hereinafter more fully described.

In the operation of the simplified non-resonant arrangement shown in FIG. 2, the current through the demagnetizing coil 12 is a minimum when the control coil current is zero, for the reason that the reactance of the saturable reactor 14 is at its maximum value. On the other hand, when the control winding 20 of the reactor is energized, the resulting saturation of the reactor lowers its reactance with the result that the current in coil 12 reaches its maximum. Thus, it is evident that by suitable control of the control winding current, the duration of the flux maximum and the rate of decay of the flux in demagnetizing coil 12 may be controlled as desired. A typical demagnetizing cycle would therefore consist of energizing the control winding to its maximum value at the start of the cycle with the work piece within the demagnetizing coil 12. Upon disconnecting the control winding from its supply, the D.C. saturation of the reactor is removed, resulting in gradual increase in impedance of the output windings and a consequent decrease in current in the demagnetizing coil with each reversal of the flux. If the demagnetizing coil is arranged with its axis at an angle to the horizontal, the work piece, which normally will have been held within the coil by the strong flux developed at the initiation of the demagnetizing cycle, will fall free as the coil current and therefore the flux reduces to its low or idling value. By reason of the relatively high impedance of the saturable reactor with the control winding deenergized, the idling or stand-by current circulating in the demagnetizing coil is very low, so that the coil may remain in the circuit with no problem of heating during standby of the equipment.

Figure 3:
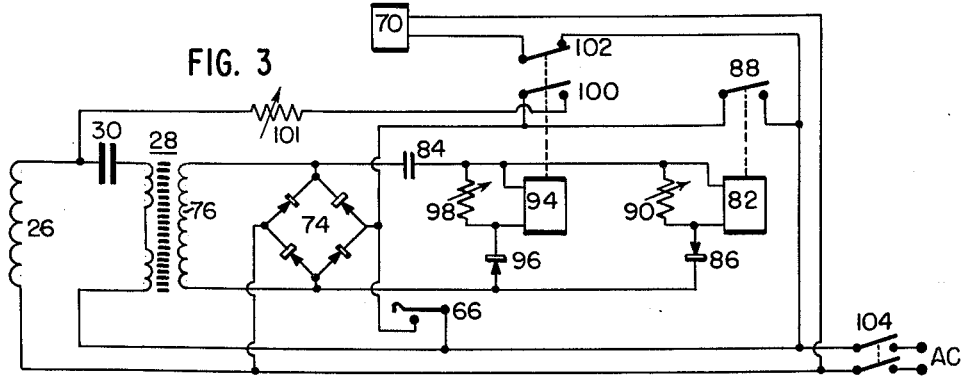
FIG. 3 is a schematic diagram illustrating in more complete fashion a typical control and switching arrangement suitable for use with the handling system shown in FIG. 1.

While the use of a saturable reactor in the supply circuit to the demagnetizing coil is effective to produce a substantial change in demagnetizing current as between peak and idling values, it is possible to achieve considerably greater current change or amplification by employing the reactor in a resonant circuit. One form of resonant circuit arrangement is illustrated in the embodiment of FIG. 3. The demagnetizing coil is illustrated at 26 and the saturable reactor at 28. Through the use of the capacitor 30, a series resonant circuit results in which the reactor forms the tunable element through variation of its reactance under the control of the current in the control winding.

Figure 6:
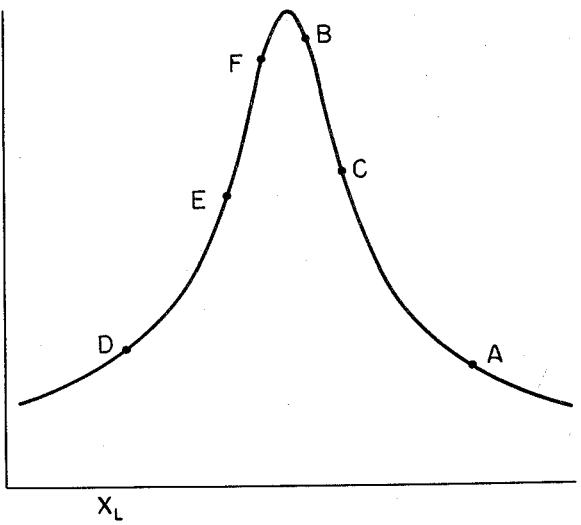
FIG. 6 is a plot of demagnetizing current as a function of reactance and serving to illustrate the mode of operation of resonant type reactor-controlled demagnetizing circuits of the invention.

The effect of this circuit arrangement is illustrated in graphical fashion in the curve shown in FIG. 6. For the proper operation of the series resonant circuit of FIG. 3, the capacitive reactance must have a value such that operation of the system remains on the right-hand side of the resonance curve for all values of inductive reactance. In this mode of operation, the maximum current in the demagnetizer coil 26 takes place when the reactor is saturated, as in the embodiment of FIG. 2, while minimum demagnetizing current in the work coil results when the saturable reactor has maximum inductance. Referring to the curve of FIG. 6, point A near the base of the curve is typical of the low current condition prevailing when the reactor has maximum inductance with the control winding deenergized. Upon saturating the reactor through applying the full D.C. control voltage of the control winding, the circulating current through the demagnetizing coil may be caused to rise to the value represented by point B near the top of the curve. Thus a very substantial change in work coil current may be caused to take place through the application and removal of a relatively small current through the control winding of the reactor.

This embodiment of the invention is particularly well suited for the demagnetization of work pieces of substantially uniform mass. This is due to the fact that large work pieces have the effect of de-tuning the system to some extent so as to lower the current in the demagnetizing coil as a result of the added inductance. Since, in general, larger work pieces require a higher value of initial flux for effective demagnetization, the reduction in demagnetizing current resulting from the de-tuning effect of large work pieces (represented by typical point C on the curve) is preferably avoided through use of other circuits to be described. This circuit does possess the advantage that the idle current condition in the demagnetizing coil results when the saturable reactor itself is deenergized, a desirable mode of operation when long standby periods are encountered.

Figure 4:
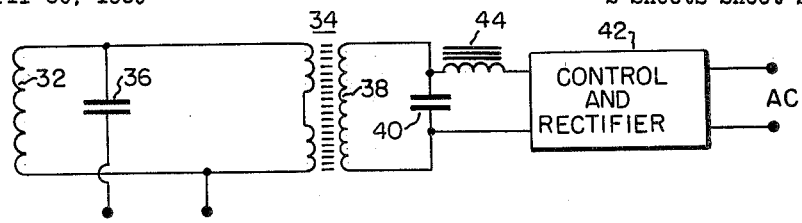
FIG. 4 is a diagram of a modified circuit arrangement employing saturable reactor control of the demagnetizing cycle.
Figure 5:
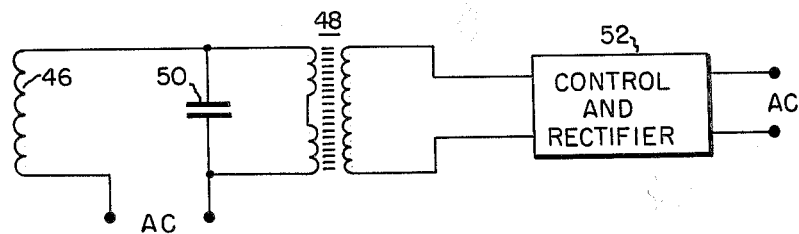
FIG. 5 is a diagram showing a further modification of saturable reactor circuit arrangement.

For applications where the same apparatus must operate effectively on work pieces of various sizes that may be presented to it, the embodiments illustrated in FIGS. 4 and 5 are particularly effective. FIG. 4 shows the work coil 32 connected in parallel with the saturable reactor 34, while the capacitor 36 is in series with the A.C. supply. In this embodiment, the circuit components will have values such that the operation takes place over the range of inductance values represented by the left-hand portion of the curve of FIG. 6, corresponding to the low inductance side of the curve. As a consequence, the saturable reactor operates with the opposite effects as compared with the embodiment of FIGS. 2 and 3. That is, removal of the current through the control winding results in maximum current through the demagnetizing coil, while conversely the reduction in the demagnetizing current requires a gradual increase of current through the control winding of the reactor.

This mode of operation is apparent from FIG. 6 wherein point D at the base of the curve on the left side may be considered to represent the current through the demagnetizing coil 32 when the saturable reactor has minimum impedance as a result of saturation produced by full voltage on the control winding. It will be seen that the resulting current flow is at a low level due to the detuning effect of the reactor. Upon turning off the reactor, its impedance rises, bringing the system into resonance with the result that the circulating current through the work coil 32 reaches a high value, which may be represented by point E on the curve for a normal size work piece in the work coil. In the event a larger than normal work piece is presented, this has the effect of tuning the system still closer to resonance as a result of the increase in inductance in the circuit, thereby causing a still larger demagnetizing current to flow through the work coil, such increased current being typified by point F on the curve.

Thus it is seen that by the shunt connection of the reactor and the work coil, or alternatively by shunt connection of reactor and capacitor, with the reactor operating in what may be termed reverse fashion, it becomes practical to provide in a reactor-controlled system a compensating arrangement in which the demagnetizing current and therefore the flux is to a considerable extent automatically regulated by the size of the work piece presented to the work coil. With small pieces, which do not require the same magnitude of initial flux as large pieces, the demagnetizing current does not reach its maximum permissible value. On the other hand, for large work pieces, the operation of the system is moved up on the current curve toward the maximum available value, thereby insuring that the largest work piece within the physical capacity of the work coil may be exposed to an initial flux that is wholly adequate to provide effective demagnetization at the end of the demagnetizing cycle.

The embodiment illustrated in FIG. 5 operates in generally similar fashion. In this arrangement the work coil 46 is supplied with current from the A.C. supply through the shunt-connected combination of the saturable reactor 48 and capacitor 50. The inductive and capacitive components have values such that when the saturable reactor is off (control coil deenergized) its inductance is so high that it has no appreciable effect on the simple series circuit of work coil 46 and capacitor 50. Under these conditions, the current flow through the work coil corresponds to the region E—F on the curve of FIG. 6, depending on the size of the work piece within the demagnetizing coil. Upon turning on the reactor by energizing the control coil, the system is de-tuned by the low impedance presented by the reactor, with the result that the demagnetizing current drops to a value indicated generally by point D, well away from the high-current resonance peak.

Mention has already been made of the fact that the saturable reactor possesses, by reason of the inductance of the control winding, a fairly large time constant so that the change of current through the output windings takes place relatively slowly. In practice, a system of the type shown in FIG. 2 may provide a decay time of the order of 1 or 2 seconds upon removing the D.C. on the control coil by simple switching. The decay time in the demagnetizing current may be lengthened appreciably through the use of a capacitor 25 connected across the control coil 20, to gradually dissipate the potential stored in the control winding when the excitation is removed. In the embodiments shown in FIGS. 4 and 5, the decay time may be lengthened by delaying the application of the saturating voltage to the control coil since, in these embodiments, minimum current in the work coil is attained when the reactor is fully saturated. An example of a delay circuit is shown in FIG. 4 as comprising a low pass filter consisting of capacitor 40 and inductance 44 in the supply to the control coil 38. A similar circuit is applicable to the FIG. 5 embodiment.

Figure 1:
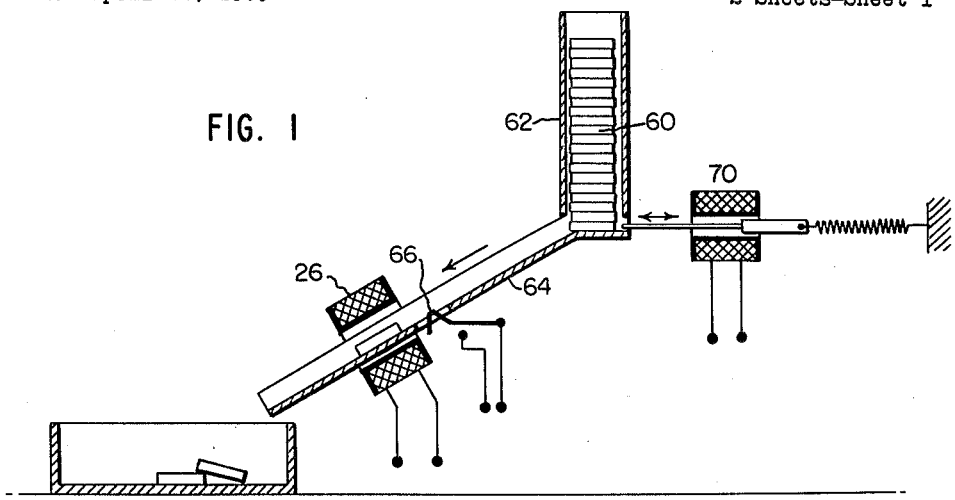
FIG. 1 is a diagrammatic view illustrating an arrangement for handling a succession of work pieces automatically, using the demagnetizing apparatus of the invention.

A further example of control means for the control coil of the reactor is illustrated in FIG. 3 which likewise illustrates provisions for automatic processing of work pieces on a production basis. As shown in FIG. 1, the work pieces 60 are arranged to pass from the storage container 62 into a chute 64 which passes through the center of the work coil 26. A work-actuated switch 66 is mounted in the path of work advance just above the demagnetizing coil so as to be actuated by the work piece as it slides down the chute toward the coil 26. A plunger actuated by solenoid 70 serves to eject work pieces one at a time from the bottom of the stack into the chute.

Referring to the diagram, FIG. 3, when the trigger switch 66 is closed by an advancing work piece, the bridge rectifier 74 is supplied with alternating current and the D.C. output of the bridge is applied to the control coil 76 of the reactor 28. The resulting saturation of the reactor brings about a substantial increase in the current circulating through the work coil 26 and the high flux is effective to retain the work piece within the demagnetizing coil against the force of gravity.

The D.C. potential that is developed across the rectifier bridge 74 serves to generate a current pulse through solenoid 82 as a result of the charging current through capacitor 84 and the conduction of diode 86. This causes the contacts 88 to close, thereby acting as a holding circuit to maintain D.C. on the control winding 76 even though the trigger switch 66 has opened upon passage of the work past it into the work coil.

The length of the period during which the control winding remains fully energized and the current through demagnetizing coil 26 at its maximum level is determined by the setting of variable resistance 90, since this determines the time required for condenser 84 to become fully charged. When it does become so charged, no further current flow takes place through solenoid 82, with the result that its contacts 88 open to disconnect the rectifier bridge 74 from the A.C. supply.

The current in the demagnetizing coil 26 now begins its decay from maximum value, with the direction of the flux reversing with each reversal of the A.C. supply voltage. Such reversal of the initially intense flux serves to carry the magnetism in the work piece through a succession of gradually diminishing hysteresis loops. The reverse surge from the control winding now acts through capacitor 84 in a direction to cause current flow through solenoid 94, diode 96 and adjusting resistor 98 to close contacts 100. This has the effect of temporarily applying the A.C. voltage in the demagnetizing circuit to the rectifier, the resulting D.C. output acting on the control coil as a positive feedback to retard the decay rate, under control of variable resistor 101.

By this arrangement it is possible with relatively simple relays and shunting adjustable resistors to provide a demagnetizing cycle having a period of uniform maximum flux of one or two seconds, followed by a decay rate that proceeds gradually, without too great a rate of decay at the outset and taking of the order of two or three seconds to reach minimum value of demagnetizing current. Upon reaching such minimum value, the work piece is released from the demagnetizing coil and slides into the collecting bin. At the same time, the decay of the demagnetizing current to idling value has removed all current from solenoid 94 with the result that contacts 102 close to energize the solenoid 70 by which the next piece of work is pushed into the feed chute, thereby tripping switch 66 and starting another demagnetizing cycle. Because of the very low idling current when the saturable reactor is deenergized, there is no need to remove the A.C. supply to the demagnetizing circuit comprising coil 26, reactor 28 and capacitor 30. Consequently there is no need to open the main supply switch 104 except when the equipment is to be shut down for a sustained period.

While it is hardly practical to give actual design values of components in view of the influence of the size of the work to be handled, it may be pointed out that successful apparatus has been operated in which the current in the demagnetizing coil varies from approximately 20 amperes at full current down to about 1 ampere at idling value, with the application of the current and the removal taking place smoothly under the control of the saturable reactor, the control coil of which is operating at a power level very much lower than that in the demagnetizing coil. In general, the control coil of the reactor will have many more turns than the output windings and as a consequence it is necessary that the output windings be quite carefully balanced in order that no appreciable A.C. voltage be induced in the control winding, since the turns ratio would produce a very considerable step up in voltage from even a small induced A.C. voltage resulting from unbalanced output windings.

There has thus been described, in conjunction with the illustrative figures, demagnetizing apparatus characterized by novel control and energizing circuits and particularly adapted for operation on a production or repetitive basis to achieve extremely low levels of residual magnetism in work pieces. While certain embodiments are particularly adapted for rapid demagnetization of work pieces of relatively uniform size, the systems are capable of handling relatively large work pieces and particular embodiments are especially adapted for operation on work pieces over a considerable range of sizes without manual adjustment.

I claim as my invention:

1. A demagnetizer for removing residual magnetism from ferrous work pieces, comprising a demagnetizing coil adapted to receive the work piece, a source of alternating current, a capacitor connected in series with the A.C. supply to the demagnetizing coil to form a series L.C. circuit, a saturable reactor having output and control windings, the output winding of the reactor being connected in the circuit with the demagnetizing coil and in control of the demagnetizing coil current, a supply of direct current for the control winding, and means in control of the D.C. through the control winding to vary the inductance of the reactor and thereby shift the series L.C. circuit between a condition close to resonance with high current in the demagnetizing coil and an off-resonance condition with low current in the demagnetizing coil.

2. A demagnetizer for removing residual magnetism from ferrous work pieces, comprising a demagnetizing coil adapted to receive the work piece, a source of alternating current, a capacitor connected in series with the A.C. supply to the demagnetizing coil to form a series L.C. circuit, a saturable reactor having output and control windings, the output winding of the reactor being connected in the circuit with the demagnetizing coil and in control of demagnetizing coil current, a source of direct current for the control winding, switching means in control of the D.C. supply to the control winding to vary the inductance of the reactor and thereby shift the series L.C. circiut between a condition close to resonance with high current in the demagnetizing coil and off-resonance condition with low current in the demagnetizing coil, and means connected to the control coil for retarding the rate of change of inductance thereof upon actuation of the switching means to cause the demagnetizing coil current to decrease.

3. A demagnetizer for removing residual magnetism from ferrous work pieces, comprising a demagnetizing coil adapted to receive the work piece, a source of alternating current, a capacitor connected in series with the A.C. supply to the demagnetizing coil to form a series L.C. circuit, a saturable reactor having output and control windings, the output winding of the reactor being connected in series with the demagnetizing coil and the capacitor, a supply of direct current for the control winding, and means in control of the flow of D.C. through the control winding to shift the inductance of the reactor from a low value wherein the L.C. circuit of demagnetizing coil and series capacitor is close to resonance and the demagnetizing coil current at a high value, to a high value of reactor inductance wherein the series L.C. circuit is off resonance and the demagnetizing coil current at a low value.

4. A demagnetizer according to claim 3 wherein the demagnetizing coil is adapted to receive work pieces of various sizes and wherein the series circuit of demagnetizing coil and capacitor operates on the high-inductance side of the resonance peak over the range of work pieces within the capacity of the demagnetizing coil.

5. A demagnetizer for removing residual magnetism from ferrous work pieces, comprising a demagnetizing coil adapted to receive the work piece, a source of alternating current, a capacitor connected in series with the A.C. supply to the demagnetizing coil to form a series L.C. circuit, a saturable reactor having output and control windings, the output winding of the reactor being connected in shunt with one of said series-connected L.C. elements, a supply of direct current for the control winding, and means in control of the flow of D.C. through the control winding to shift the inductance of the reactor from a high value wherein the L.C. circuit of demagnetizing coil and series capacitor is close to resonance and the demagnetizing coil current at a high value, to a low value of reactor inductance wherein the series L.C. circuit is off resonance and the demagnetizing coil current at a low value.

6. A demagnetizer according to claim 5 wherein the demagnetizing coil is adapted to receive work pieces of various sizes and wherein the series L.C. circuit of demagnetizing coil and capacitor operates on the low-inductance side of the resonance peak over the range of work pieces within the capacity of the demagnetizing coil.

7. A demagnetizer for removing residual magnetism from ferrous work pieces, comprising a demagnetizing coil adapted to receive the work piece, a source of alternating current, a capacitor connected in series with the A.C. supply to the demagnetizing coil to form a series L.C. circuit, a saturable reactor having output and control windings, the output winding of the reactor being connected in the circuit with the demagnetizing coil and in control of the demagnetizing coil current, a supply of direct current for the control winding, and means in control of the D.C. through the control winding to vary the inductance of the reactor and thereby shift the series L.C. circuit between a condition close to resonance with high current in the demagnetizing coil and an off-resonance condition with low current in the demagnetizing coil, and feedback connections between the demagnetizing coil circuit and the control coil circuit for applying to the control coil a direct current to retard the change in inductance of the control coil and thereby prolong the decay of demagnetizing current.

8. A demagnetizer for removing residual magnetism from ferrous work pieces, comprising a demagnetizing coil adapted to receive the work pieces, a source of alternating current, a capacitor connected in series with the A.C. supply to the demagnetizing coil to form a series L.C. circuit, a saturable reactor having output and control windings, the output winding of the reactor being connected in the circuit with the demagnetizing coil and in control of the demagnetizing coil current, a supply of direct current for the control winding, and means in control of the D.C. through the control winding to vary the inductance of the reactor and thereby shift the series L.C. circuit between a condition close to resonance with high current in the demagnetizing coil and an off-resonance condition with low current in the demagnetizing coil, a guideway for directing work pieces into proximity to the demagnetizing coil, the means in control of control coil current including a switch disposed in the path of work pieces along the guideway to the demagnetizing coil to initiate high current flow through the coil upon the passage of a work piece past the switch, the work piece being held within the coil by the flux generated by said current and falling from the coil upon decrease of the current in the coil.

References Cited in the file of this patent

UNITED STATES PATENTS

| | | |
|---|---|---|
| 2,535,481 | Begun | Dec. 26, 1950 |
| 2,685,653 | Orr | Aug. 3, 1954 |
| 2,694,176 | Lang | Nov. 9, 1954 |
| 2,794,165 | Van Scoyoc | May 28, 1957 |
| 2,898,408 | Folse | Aug. 4, 1959 |
| 2,937,321 | Decker et al. | May 17, 1960 |